US011599087B2

(12) United States Patent
Liu et al.

(10) Patent No.: US 11,599,087 B2
(45) Date of Patent: Mar. 7, 2023

(54) SYSTEM AND METHOD OF UTILIZING INFORMATION HANDLING SYSTEM IDENTITY TYPES WITH MOTHERBOARDS OF INFORMATION HANDLING SYSTEMS

(71) Applicant: Dell Products L.P., Round Rock, TX (US)

(72) Inventors: Wei G. Liu, Austin, TX (US); Richard L. Holmberg, Austin, TX (US); Mark W. Shutt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 17/076,421

(22) Filed: Oct. 21, 2020

(65) Prior Publication Data

US 2022/0121171 A1     Apr. 21, 2022

(51) Int. Cl.
*G05B 19/4097* (2006.01)

(52) U.S. Cl.
CPC ........ *G05B 19/4097* (2013.01); *G05B 2219/45031* (2013.01)

(58) Field of Classification Search
CPC .............. G05B 19/4097; G05B 2219/35134
See application file for complete search history.

(56) References Cited

U.S. PATENT DOCUMENTS

| 8,370,618 | B1 * | 2/2013 | Yakovlev | G06F 13/102 |
| | | | | 710/305 |
| 10,489,338 | B1 * | 11/2019 | Chien | G06F 9/4411 |
| 2003/0217193 | A1 * | 11/2003 | Thurston | G06F 8/65 |
| | | | | 719/321 |
| 2015/0363323 | A1 * | 12/2015 | Yu | G06F 3/0619 |
| | | | | 711/133 |
| 2016/0210132 | A1 * | 7/2016 | Gerhart | G06F 8/654 |
| 2019/0245696 | A1 * | 8/2019 | Gulati | G06F 8/61 |
| 2021/0064560 | A1 * | 3/2021 | Zou | G06F 8/63 |

FOREIGN PATENT DOCUMENTS

CN     201374055 Y   * 12/2009

OTHER PUBLICATIONS

MX25U3273F, 1.8V, 32M-BIT [x 1/x 2/x 4] CMOS MXSMIO (Serial Multi I/O) Flash Memory, Macronix International Co., LTD., Sep. 13, 2016.

* cited by examiner

*Primary Examiner* — Thomas C Lee
*Assistant Examiner* — Ameir Myers
(74) *Attorney, Agent, or Firm* — McDermott Will & Emery LLP (57) ABSTRACT

In one or more embodiments, an information handling system (IHS) manufacturer is configured to: manufacture multiple motherboards configured to be installed in multiple IHS product lines; respectively install multiple non-volatile memory media on the multiple motherboards; store first product line firmware, associated with a first product line of the IHS manufacturer, via the multiple non-volatile memory media; provide a first portion of the multiple motherboards to a first division; and provide a second portion of the multiple motherboards to a second division; the first division is configured to: permanently store a first IHS identity type on the first portion of the multiple motherboards; and the second division is configured to: permanently store a second IHS identity type on the second portion of the multiple motherboards; and store second product line firmware via non-volatile memory media of the second portion of the multiple motherboards.

20 Claims, 7 Drawing Sheets

SYSTEM AND METHOD OF UTILIZING INFORMATION HANDLING SYSTEM IDENTITY TYPES WITH MOTHERBOARDS OF INFORMATION HANDLING SYSTEMS

BACKGROUND

Field of the Disclosure

This disclosure relates generally to information handling systems and more particularly to utilizing information handling system identity types with motherboards of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, a manufacturing system may include an information handling system manufacturer, a first division of the information handling system manufacturer, a second division of the information handling system manufacturer, and a storage facility of the information handling system manufacturer, among others. In one or more embodiments, the information handling system manufacturer may be configured to: manufacture multiple motherboards configured to be installed in multiple information handling system product lines; respectively install multiple non-volatile memory media on the multiple motherboards; store first product line information handling system firmware, associated with a first product line of the information handling system manufacturer, via the multiple non-volatile memory media; provide a first portion of the multiple motherboards to the first division; provide a second portion of the multiple motherboards to the second division; and provide a third portion of the multiple motherboards to the storage facility. In one or more embodiments, the first division may be configured to: permanently store a first information handling system identity type on the first portion of the multiple motherboards; and install the first portion of the multiple motherboards in first multiple information handling systems. In one or more embodiments, the second division may be configured to: permanently store a second information handling system identity type on the second portion of the multiple motherboards; store second product line information handling system firmware, associated with a second product line of the information handling system manufacturer, via non-volatile memory media of the second portion of the multiple motherboards; and install the second portion of the multiple motherboards in second multiple information handling systems.

In one or more embodiments, the storage facility may be further configured to: receive a request for a motherboard associated with the first product line; and permanently store the first information handling system identity type on a motherboard of the third portion of the multiple motherboards. In one or more embodiments, the storage facility may be further configured to ship the motherboard of the third portion of the multiple motherboards to a customer associated with the request for the motherboard associated with the first product line. In one or more embodiments, the storage facility may be further configured to: receive a request for a motherboard associated with the second product line; permanently store the second information handling system identity type on a motherboard of the third portion of the multiple motherboards; and store the second product line information handling system firmware via a non-volatile memory medium of the motherboard of the third portion of the multiple motherboards. In one or more embodiments, the storage facility may be further configured to ship the motherboard of the third portion of the multiple motherboards to a customer associated with the request for the motherboard associated with the second product line.

In one or more embodiments, the first division may be further configured to ship the first multiple information handling systems to first multiple customers, and the second division may be further configured to ship the second multiple information handling systems to second multiple customers. For example, a customer of the first multiple customers is a customer of the second multiple customers. In one or more embodiments, the storage facility may be further configured to: ship a motherboard of the third portion of the multiple motherboards to a customer and provide an application configured to permanently store the first information handling system identity type or the second information handling system identity type on the motherboard of the third portion of the multiple motherboards. In one or more embodiments, the information handling system manufacturer may be further configured to: store a first certificate associated with the first product line on the multiple mother boards, in which the first certificate includes a first public key utilizable to authenticate the first product line information handling system firmware and store a second certificate associated with the second product line on the multiple mother boards, in which the second certificate includes a second public key utilizable to authenticate the second product line information handling system firmware.

In one or more embodiments, one or more systems, one or more methods, and/or one or more processes may enter a system management mode; may determine an information handling system (IHS) identity type from a non-volatile memory medium; may determine, based at least one the IHS identity type, a public encryption key from multiple public encryption keys; may receive an information handling system firmware image that includes new information handling system firmware and a signature of the new information handling system firmware; may decrypt, utilizing the public encryption key, the signature of the new information handling system firmware to obtain decrypted signature data; may determine a hash value of the new information handling system firmware; may determine if the hash value matches the decrypted signature data; if the hash value does not match the decrypted signature data, may provide information indicating that the information handling system firmware image will not be installed; and if the hash value matches the decrypted signature data, may install the new information handling system firmware. In one or more embodiments, the one or more systems, the one or more methods, and/or the one or more processes may further retrieve the multiple public encryption keys from respective multiple certificates stored by the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system (IHS) manufacturer may utilize a motherboard design to produce multiple types of information handling systems (IHSs) for multiple product lines. For example, the IHS manufacturer may utilize the motherboard design to produce servers and data storage systems. In one or more embodiments, information handling system firmware (information handling system firmware) may be signed with a private encryption key. When signing information handling system firmware for a server with the private encryption key and signing information handling system firmware for a data storage system with the private encryption key, for example, a security issue may arise. When signing information handling system firmware for a server with the private encryption key and signing information handling system firmware for a data storage system with different private encryption keys, for instance, different part numbers for the same motherboard design may become an issue.

In one or more embodiments, during a portion of a manufacturing process, an IHS identity type may be stored on a motherboard of an IHS. For example, while a server and a data storage system may share the same motherboard design, a first IHS identity type may be stored on a motherboard of the server, and a second IHS identity type (different from the first IHS identity type) may be stored on a motherboard of the data storage system. In one or more embodiments, an IHS identity type may be stored on a motherboard of an IHS in a non-volatile memory medium of the IHS. In one example, the non-volatile memory medium of the IHS may include a portion that may be write-once (e.g., one-time programmable (OTP)). In another example, the non-volatile memory medium of the IHS may be write-once (e.g., OTP). In one or more embodiments, writing information to an OTP non-volatile memory medium or to a portion of non-volatile memory medium that is OTP may be referred to as fusing the information to the non-volatile memory medium. For example, writing information to a motherboard that includes an OTP non-volatile memory medium or to a portion of non-volatile memory medium that is OTP may be referred to as fusing the information to the motherboard. For instance, an IHS identity type may be fused to a motherboard of an IHS.

In one or more embodiments, an IHS identity type may facilitate installing and/or upgrading information handling system firmware on an IHS. For example, this may permit multiple divisions of the IHS manufacturer to develop specific information handling system firmware for a specific IHS types and/or product lines. For instance, server information handling system firmware may only be installed on a server, and data storage system information handling system firmware may only be installed on a data storage system. In one or more embodiments, each of the divisions of the IHS manufacturer may be assigned its own private encryption key to sign information handling system firmware that the division develops. In one example, a server division of the IHS manufacturer may be assigned a first private encryption key (e.g., a server signing key) to sign information handling system firmware that the server division develops (e.g., server information handling system firmware). In another example, a data storage system division of the IHS manufacturer may be assigned a second private encryption key (e.g., a storage system signing key) to sign information handling system firmware that the data storage system division develops (e.g., storage system information handling system firmware).

In one or more embodiments, a motherboard may be initially programmed with server information handling system firmware, but an IHS identity type for the motherboard may not be stored by the motherboard. For example, the motherboard may be initially programmed with server information handling system firmware so that testing and/or quality assurance may be performed after the motherboard is produced. In one or more embodiments, after an IHS identity type for the motherboard is stored by the motherboard, only an information handling system firmware of a type associated with the IHS identity type may be stored via the motherboard. For example, an application may be executed by a processor of the motherboard to store the IHS identity type via the motherboard. For instance, this may provide flexibility in manufacturing different end product IHSs that utilize the same motherboard design.

In one or more embodiments, an application may include a configuration option that may only become available when the motherboard does not store an IHS identity type. For example, the application may be utilized to write a service tag to the motherboard if the motherboard does not have a service tag. In one or more embodiments, after an IHS identity type is stored via an IHS, a system management mode (SMM) may determine the IHS identity type. After the IHS identity type is determined, the SMM may determine a public encryption key based at least on the IHS identity type. For example, the SMM may utilize the public encryption key to authenticate an incoming information handling system firmware image before updating information handling system firmware of the IHS.

As an example, if the IHS identity type is a server IHS identity type, a public encryption key may be determined based at least on the server IHS identity type. If an incoming information handling system firmware image is a server information handling system firmware image, the server information handling system firmware image may be authenticated, utilizing the public encryption key. If an incoming information handling system firmware image is a storage system information handling system firmware image, the storage system information handling system firmware image may not be authenticated, utilizing the public encryption key, since the public key may be associated with the server identity type. As another example, if the IHS identity type is a storage system IHS identity type, another public encryption key may be determined based at least on the storage system IHS identity type. If an incoming information handling system firmware image is a storage system information handling system firmware image, the storage system information handling system firmware image may be authenticated, utilizing the other public encryption key. If an incoming information handling system firmware image is a server information handling system firmware image, the server information handling system firmware image may not be authenticated, utilizing the public encryption key, since the public key may be associated with the storage system identity type.

Figure 1A:
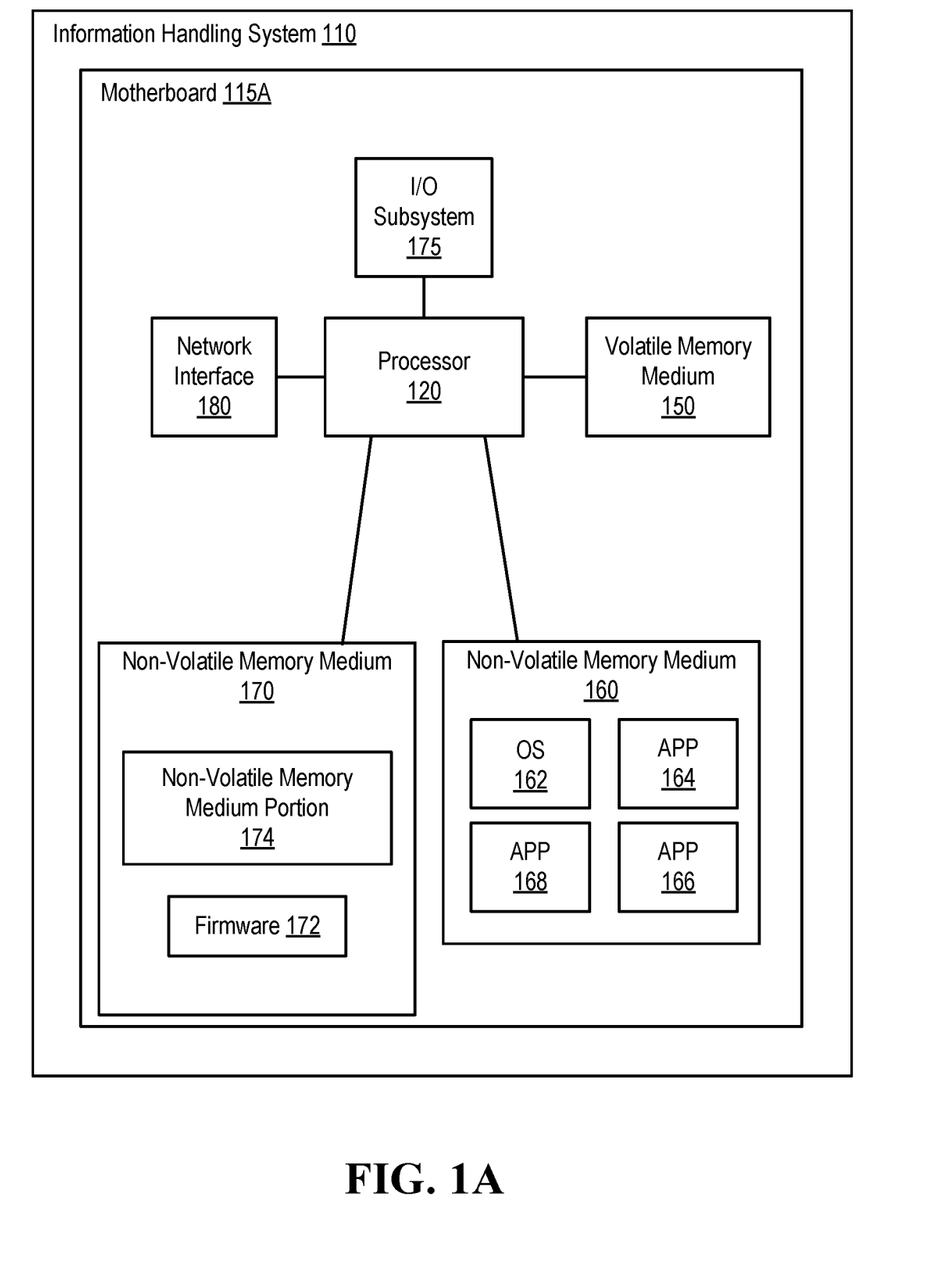
FIGS. 1A and 1B illustrate examples of information handling systems, according to one or more embodiments.
Figure 1B:
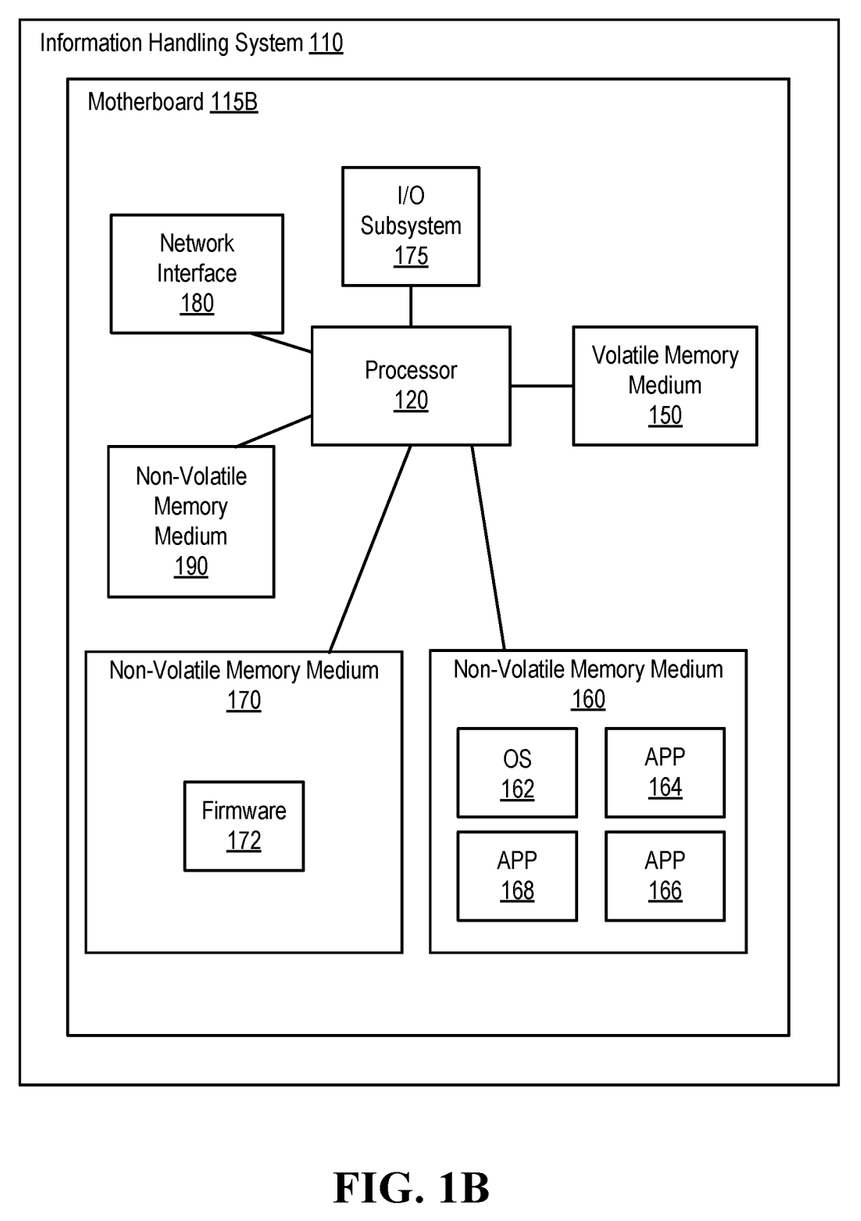

Turning now to FIGS. 1A and 1B, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, firmware 172 may include processor instructions executable by processor 120. For example, firmware 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of firmware 172 via non-volatile memory medium 170. In another instance, one or more portions of the processor instructions of firmware 172 may be transferred to volatile memory medium 150, and processor 120 may execute the one or more portions of the processor instructions of firmware 172 via volatile memory medium 150.

In one or more embodiments, processor 120 and one or more components of IHS 110 may be included in a systemon-chip (SoC). For example, the SoC may include processor 120 and a platform controller hub (not specifically illustrated).

As illustrated in FIG. 1A, non-volatile memory medium 170 may include a non-volatile memory medium portion 174. For example, motherboard 115A may be configured with non-volatile memory medium 170 that includes non-volatile memory medium portion 174. For instance, non-volatile memory medium 170 that includes non-volatile memory medium portion 174 may be installed on motherboard 115A. In one or more embodiments, non-volatile memory medium portion 174 may be OTP. For example, information stored via non-volatile memory medium portion 174 may not be overwritten or changed. For instance, an IHS identity type may be stored via non-volatile memory medium portion 174.

As shown in FIG. 1B, IHS 110 may include a non-volatile memory medium 190. For example, motherboard 115B may be configured with non-volatile memory medium 190. For instance, non-volatile memory medium 190 may be installed on motherboard 115B. As illustrated in FIG. 1B, non-volatile memory medium 190 may be communicatively coupled to processor 120. In one or more embodiments, non-volatile memory medium 190 may be OTP. For example, information stored via non-volatile memory medium 190 may not be overwritten or changed. For instance, an IHS identity type may be stored via non-volatile memory medium 190. Although not specifically illustrated, a platform controller hub may include a non-volatile memory medium 190, according to one or more embodiments. For example, a platform controller hub may be configured with a non-volatile memory medium 190. In one or more embodiments, a platform controller hub may include a non-volatile memory medium that includes one or more structures and/or functionalities of those described with reference to non-volatile memory medium 190. In one or more embodiments, a platform controller hub may include a non-volatile memory medium that includes one or more structures and/or functionalities of those described with reference to non-volatile memory medium 170.

Figure 2A:
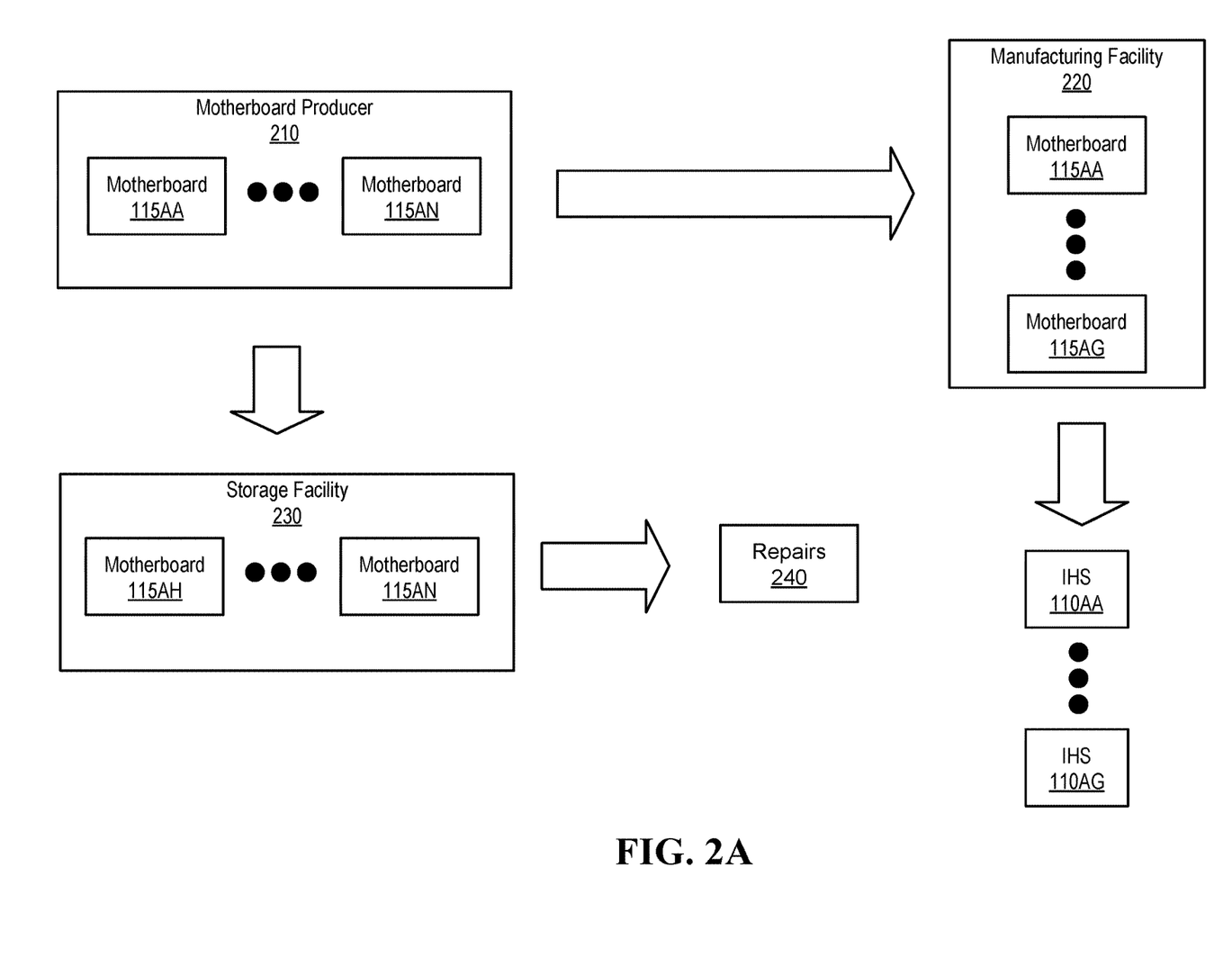
FIGS. 2A and 2B illustrate examples of manufacturing information handling systems, according to one or more embodiments.
Figure 2B:
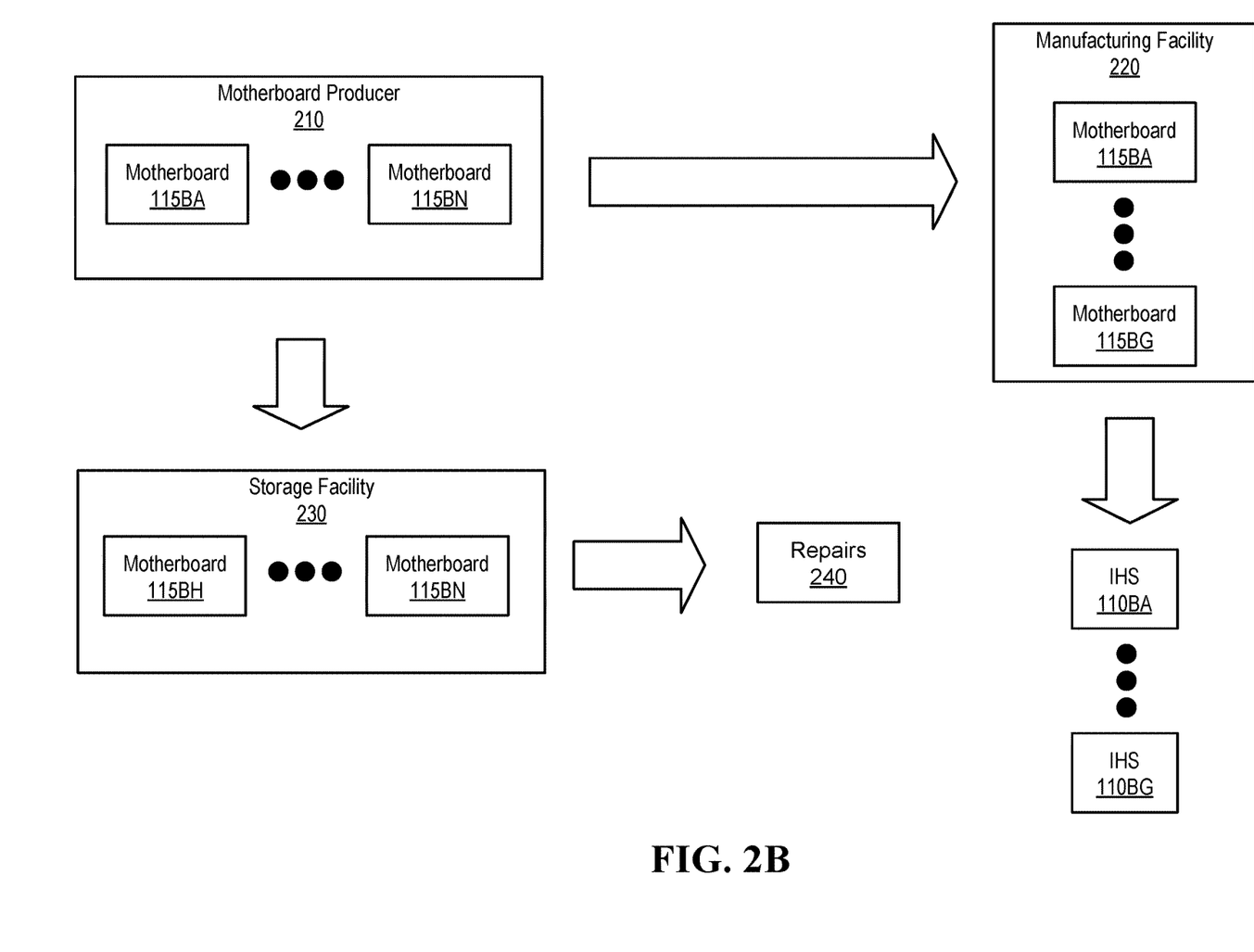

Turning now to FIGS. 2A and 2B, examples of manufacturing information handling systems are illustrated, according to one or more embodiments. In one or more embodiments, a motherboard producer may produce motherboards 115A. For example, as shown in FIG. 2A, a motherboard producer 210 may produce motherboards 115AA-115AN. In one or more embodiments, a motherboard producer may produce motherboards 115B. For example, as illustrated, in FIG. 2B, motherboard producer 210 may produce motherboards 115BA-115BN.

In one or more embodiments, a first portion of the motherboards may be provided to an IHS manufacturing facility. As shown in FIG. 2A, motherboards 115AA-115AG may be provided to an IHS manufacturing facility 220. As illustrated, in FIG. 2B, motherboards 115BA-115BG may be provided to IHS manufacturing facility 220. In one or more embodiments, a second portion of the motherboards may be provided to storage facility. For example, the storage facility may store the second portion of the motherboards for a period of time. As shown in FIG. 2A, motherboards 115AH-115AN may be provided to a storage facility 230. For example, storage facility 230 may store motherboards 115AH-115AN for a period of time. As illustrated, in FIG. 2B, motherboards 115BH-115BN may be provided to storage facility 230. For example, storage facility 230 may store motherboards 115BH-115BN for a period of time.

In one or more embodiments, the IHS manufacturing facility may utilize the first portion of motherboards to produce first IHSs. As shown in FIG. 2A, IHS manufacturing facility 220 may utilize motherboards 115AA-115AG to produce IHSs 110AA-110AG. As shown in FIG. 2B, IHS manufacturing facility 220 may utilize motherboards 115BA-115BG to produce IHSs 110BA-110BG.

In one or more embodiments, after the period of time, the storage facility may provide the second portion of motherboards to repairs. In one example, the repairs may be conducted on one or more customer premises (e.g., in the field). In another example, the repairs may be conducted via a repair facility. After the period of time, as shown in FIG. 2A, storage facility 230 may provide motherboards 115AH-115AN to repairs 240. After the period of time, as illustrated in FIG. 2B, storage facility 230 may provide motherboards 115BH-115BN to repairs 240.

Figure 3:
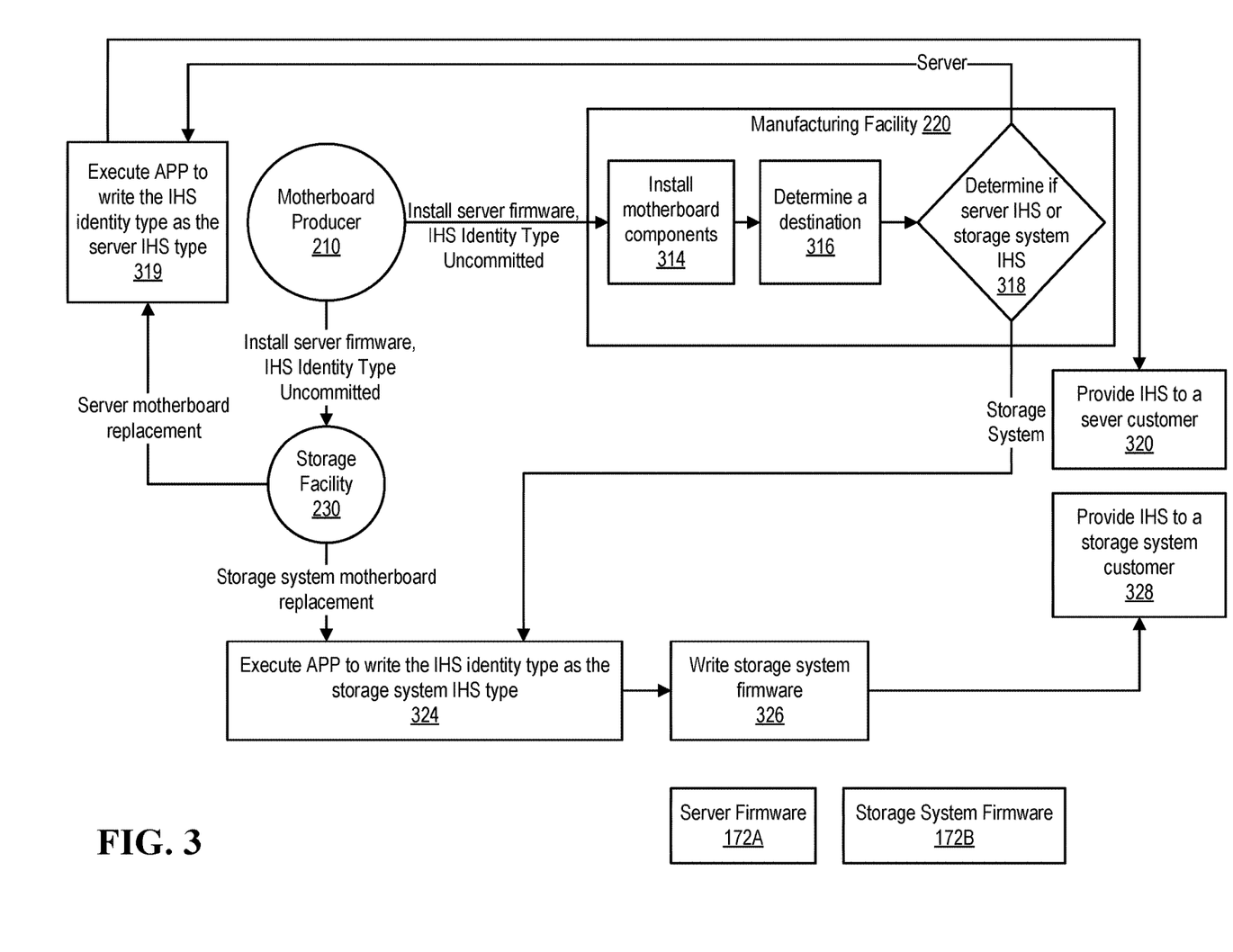
FIG. 3 illustrates an example of a process of configuring motherboards with information handling system type identifications, according to one or more embodiments.

Turning now to FIG. 3, an example of a process of configuring motherboards with information handling system type identifications is illustrated, according to one or more embodiments. As shown, when motherboard producer 210 produces a motherboard 115 for manufacturing facility 220, firmware may be stored via motherboard 115. For example, server firmware 172A may be stored via motherboard 115. As illustrated, an IHS identity type may be uncommitted. For example, an IHS identity type may not be stored via motherboard 115 provided to manufacturing facility 220. As shown, motherboard 115 may be provided to manufacturing facility 220.

As illustrated, when motherboard producer 210 produces a motherboard 115 for storage facility 230, firmware may be stored via motherboard 115. In one or more embodiments, the firmware may be server firmware. As shown, an IHS identity type may be uncommitted. For example, an IHS identity type may not be stored via motherboard 115 provided to storage facility 230. As illustrated, motherboard 115 may be provided to storage facility 230.

As shown, after a motherboard 115 is received by manufacturing facility 220, motherboard components may be installed at 314. In one or more embodiments, motherboard components may one or more of a processor 120, a volatile memory medium 150, a non-volatile memory medium 160, an I/O subsystem 175, and a network interface 180, among others. At 316, a destination of motherboard 115 may be determined. In one example, a destination may be a server IHS 110. In another example, a destination may be a storage system IHS 110.

At 318, it may be determined if the destination is a server IHS 110 or a storage system IHS 110. If the destination is a server IHS 110, an APP may be executed to write the IHS identity type as the server IHS identity type, at 319. In one example, the APP may be executed to write the IHS identity type as the server IHS identity type to non-volatile memory portion 174 (illustrated in FIG. 1A). In another example, the APP may be executed to write the IHS identity type as the server IHS identity type to non-volatile memory medium 190 (illustrated in FIG. 1B). At 320, server IHS 110 may be provided to a server customer.

If the destination is a storage system IHS 110, the APP may be executed to write the IHS identity type as the storage system IHS identity type, at 324. In one example, the APP may be executed to write the IHS identity type as the storage system IHS identity type to non-volatile memory portion 174 (illustrated in FIG. 1A). In another example, the APP may be executed to write the IHS identity type as the storage system IHS identity type to non-volatile memory medium 190 (illustrated in FIG. 1B). At 326, storage system firmware may be written. For example, storage system firmware 172B may be stored via non-volatile memory medium 170. At 328, storage system IHS 110 may be provided to a storage system customer.

In one or more embodiments, a motherboard 115 may need to be replaced. As shown, if a server motherboard needs to be replaced, the process may proceed to 319, where the APP may be executed to write the IHS identity type as the server IHS identity type to a replacement motherboard 115 from storage facility 230. In one example, the APP may be executed to write the IHS identity type as the storage system IHS identity type to non-volatile memory portion 174 (illustrated in FIG. 1A). In another example, the APP may be executed to write the IHS identity type as the storage system IHS identity type to non-volatile memory medium 190 (illustrated in FIG. 1B).

As illustrated, if a storage system motherboard needs to be replaced, the process may proceed to 324, where an APP may be executed to write the IHS identity type as the storage system IHS identity type to a replacement motherboard 115 from storage facility 230. In one example, the APP may be executed to write the IHS identity type as the storage system IHS identity type to non-volatile memory portion 174 (illustrated in FIG. 1A). In another example, the APP may be executed to write the IHS identity type as the storage system IHS identity type to non-volatile memory medium 190 (illustrated in FIG. 1B).

Figure 4:
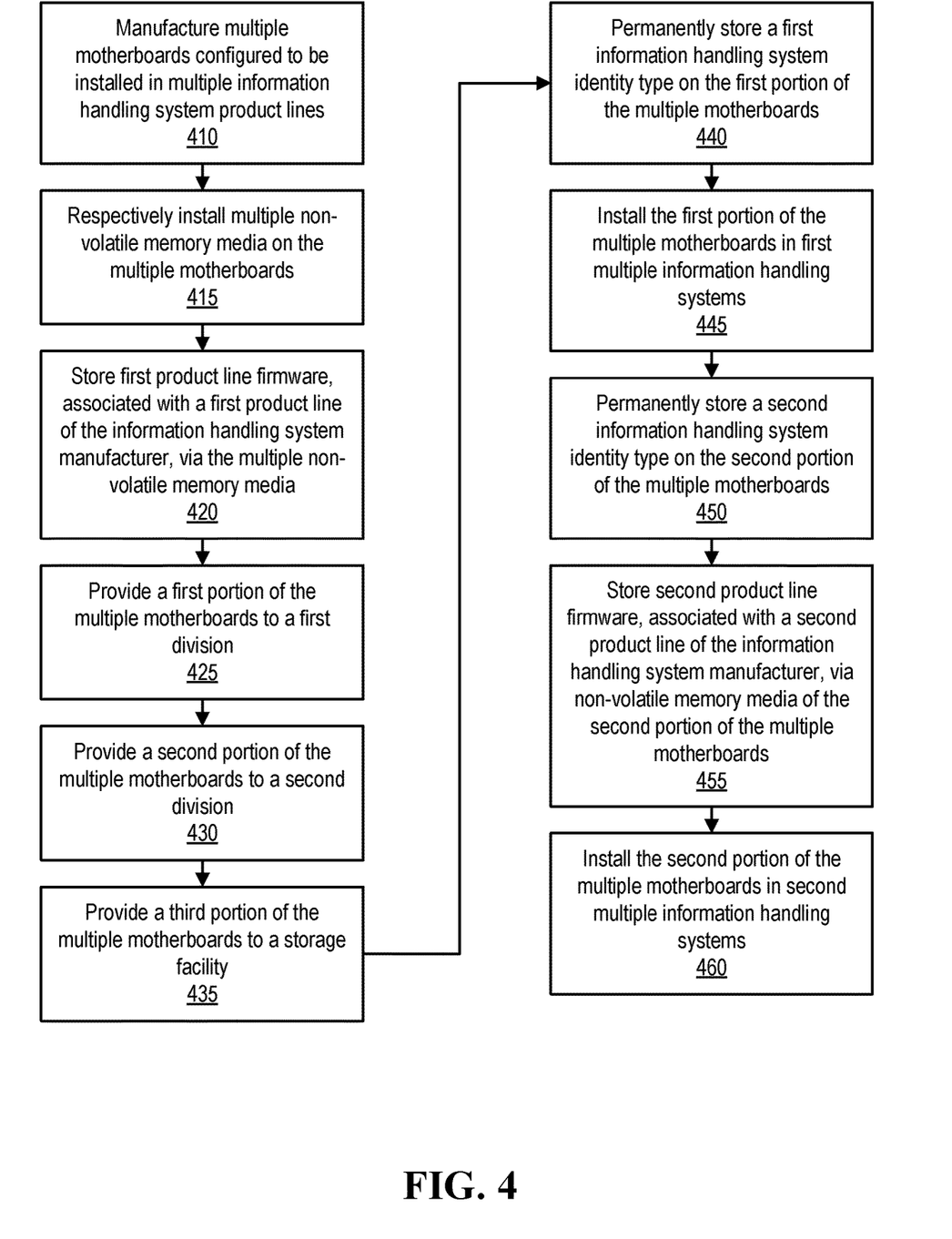
FIG. 4 illustrates an example of a method of operating a manufacturing system, according to one or more embodiments.

Turning now to FIG. 4, an example of a method of operating a manufacturing system is illustrated, according to one or more embodiments. At 410, multiple motherboards configured to be installed in multiple information handling system product lines may be manufactured. For example, an information handling system manufacturer may manufacture multiple motherboards configured to be installed in multiple information handling system product lines.

At 415, multiple non-volatile memory media may be respectively installed on the multiple motherboards. For example, the information handling system manufacturer may respectively install multiple non-volatile memory media on the multiple motherboards. At 420, first product line firmware, associated with a first product line of the information handling system manufacturer, may be stored via the multiple non-volatile memory media. For example, the information handling system manufacturer may store first product line firmware, associated with a first product line of the information handling system manufacturer, via the multiple non-volatile memory media. In one instance, server firmware 172A may be stored via multiple non-volatile memory media 170 of multiple motherboards 115A. In another instance, server firmware 172A may be stored via multiple non-volatile memory media 170 of multiple motherboards 115B.

At 425, a first portion of the multiple motherboards may be provided to a first division of the information handling system manufacturer. For example, the information handling system manufacturer may provide a first portion of the multiple motherboards to the first division of the information handling system manufacturer. In one or more embodiments, the first portion of the multiple motherboards may include at least two of the multiple motherboards. At 430, a second portion of the multiple motherboards may be provided to a second division of the information handling system manufacturer. For example, the information handling system manufacturer may provide a second portion of the multiple motherboards to a second division of the information handling system manufacturer. In one or more embodiments, the second portion of the multiple motherboards may include at least two of the multiple motherboards.

At 435, a third portion of the multiple motherboards may be provided to a storage facility of the information handling system manufacturer. For example, the information handling system manufacturer may provide a third portion of the multiple motherboards to the storage facility of the information handling system manufacturer. In one or more embodiments, the third portion of the multiple motherboards may include at least two of the multiple motherboards. At 440, a first information handling system identity type may be permanently stored on the first portion of the multiple motherboards. For example, the first division may permanently store a first information handling system identity type on the first portion of the multiple motherboards. At 445, the first portion of the multiple motherboards may be installed in first multiple information handling systems. For example, the first division may install the first portion of the multiple motherboards in first multiple information handling systems.

At 450, a second information handling system identity type may be permanently stored on the second portion of the multiple motherboards. For example, the second division may permanently store a second information handling system identity type on the second portion of the multiple motherboards. At 455, second product line firmware, associated with a second product line of the information handling system manufacturer, may be stored via non-volatile memory media of the second portion of the multiple motherboards. For example, the second division may store second product line firmware, associated with a second product line of the information handling system manufacturer, via non-volatile memory media of the second portion of the multiple motherboards. In one instance, storage system firmware 172B may be stored via multiple non-volatile memory media 170 of the second portion of the multiple motherboards 115A. In another instance, storage system firmware 172B may be stored via multiple non-volatile memory media 170 of the second portion of the multiple motherboards 115B. At 460, the second portion of the multiple motherboards may be installed in second multiple information handling systems. For example, the second division may install the second portion of the multiple motherboards in second multiple information handling systems.

Figure 5:
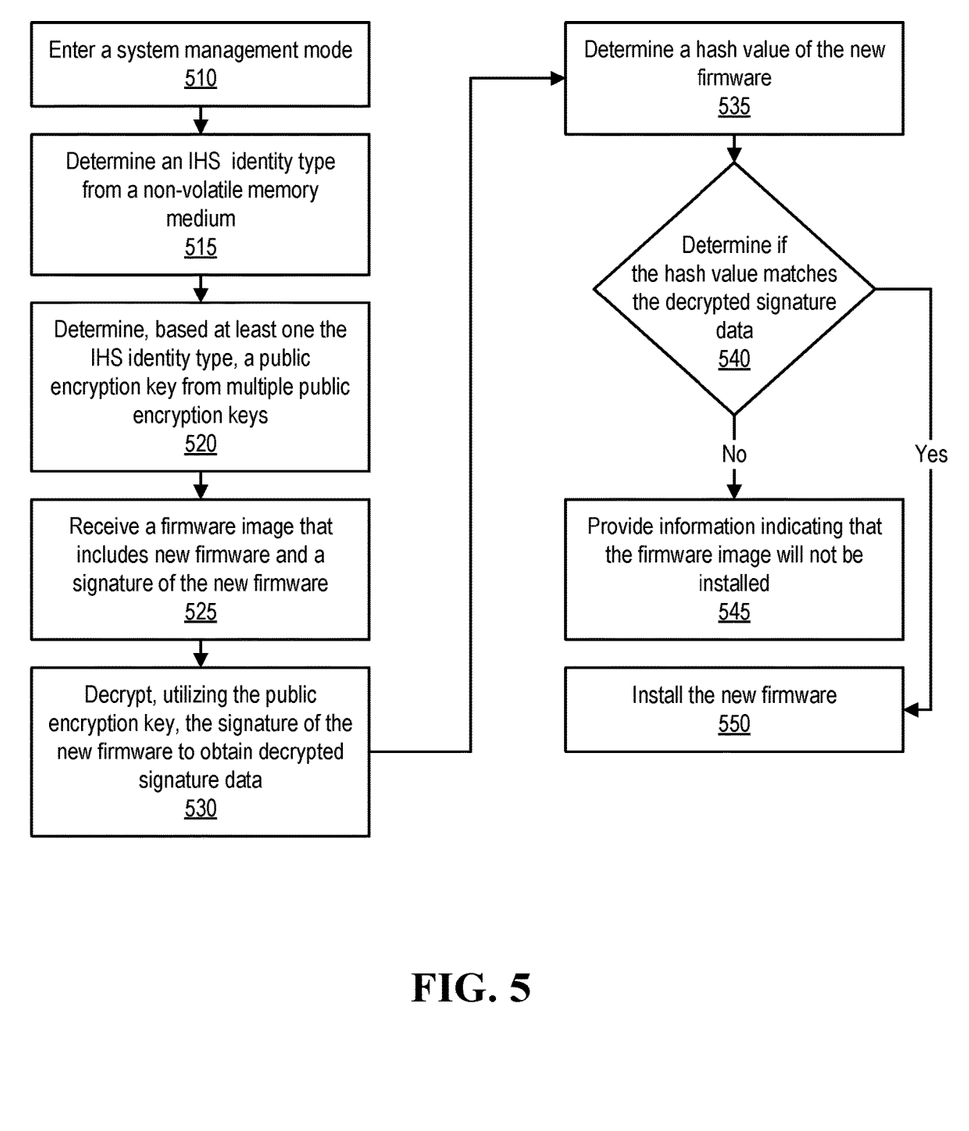
FIG. 5 illustrates an example of a method of operating an information handling system, according to one or more embodiments.

Turning now to FIG. 5, an example of a method of operating an information handling system is illustrated, according to one or more embodiments. At 510, a system management mode may be entered. For example, IHS 110 may enter a system management mode. In one or more embodiments, a system management interrupt (SMI) may be generated. For example, IHS 110 may generate a SMI. For instance, the SMI may cause IHS 110 to enter the system management mode. In one or more embodiments, a SMI handler may include instructions executable by processor 120. For example, firmware 172 may include the SMI handler. In one or more embodiments, processor 120 may execute instructions in an elevated execution privilege state when in the system management mode. For example, processor 120 may execute instructions of a SMI handler in an elevated execution privilege state. In one or more embodiments, the SMI handler may include instructions of the system management mode. In one or more embodiments, the SMI handler may include instructions that may implement one or more of method elements 515-550.

At 515, an IHS identity type may be determined from a non-volatile memory medium. In one example, IHS 110 may determine an IHS identity type from non-volatile memory medium 170. For instance, IHS 110 may determine an IHS identity type from non-volatile memory medium portion 174 of non-volatile memory medium 170. In another example, IHS 110 may determine an IHS identity type from non-volatile memory medium 190.

At 520, a public encryption key from multiple public encryption keys may be determined based at least one the IHS identity type. For example, IHS 110 may determine, based at least one the IHS identity type, a public encryption key from multiple public encryption keys. In one or more embodiments, IHS 110 may retrieve the multiple public encryption keys from respective multiple certificates stored by IHS 110. As an example, the multiple certificates may be stored via non-volatile memory medium 170.

At 525, a firmware image that includes new firmware and a signature of the new firmware may be received. For example, IHS 110 may receive a firmware image that includes new firmware and a signature of the new firmware. In one or more embodiments, the signature of the new firmware may be an encrypted hash value of the new firmware. For example, a hash value of the new firmware may be encrypted via a private encryption key to generate the signature of the new firmware. For instance, a public encryption key, which corresponds to the private encryption key, may be utilized to decrypt the signature of the new firmware to obtain the hash value of the new firmware. If another public encryption key, which does not correspond to the private encryption key, is utilized to decrypt the signature of the new firmware, an incorrect hash value of the new firmware may be obtained. In one or more embodiments, if another public encryption key, which does not correspond to the private encryption key, is utilized to decrypt the signature of the new firmware, garbage data may be obtained.

In one or more embodiments, a private encryption key may be different from a public encryption key. For example, the private encryption key and the public encryption key may be asymmetric encryption keys. In one instance, data encrypted via the private encryption key may be decrypted via the public encryption key. In another instance, data encrypted via the public encryption key may be decrypted via private encryption key. In one or more embodiments, a hash value may be generated via a one-way hash function. For example, the new firmware of the firmware image may be provided as input to the one-way hash function to obtain a hash value of the new firmware. In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, SHA-384, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1 = h_2(h_3(h_4(z)))$. For instance, a one-way hash function that is a composite function of two or more one-way hash functions may be considered to be and/or said to be strengthened.

At 530, the signature of the new firmware may be decrypted, utilizing the public encryption key, to obtain decrypted signature data. For example, IHS 110 may decrypt, utilizing the public encryption key, the signature of the firmware to obtain decrypted signature data. In one or more embodiments, the decrypted signature data may include the hash value of the new firmware or may include garbage data if an incorrect public encryption key is utilized.

At 535, a hash value of the new firmware may be determined. For example, IHS 110 may determine a hash value of the firmware. At 540, it may be determined if the hash value matches the decrypted signature data. For example, IHS 110 may determine if the hash value matches the decrypted signature data. If the hash value does not match the decrypted signature data, information indicating that the firmware image will not be installed may be provided, at 545. For example, if the hash value does not match the decrypted signature data, IHS 110 may provide information indicating that the firmware image will not be installed.

In one or more embodiments, the hash value may not match the decrypted signature data because an incorrect public encryption key was utilized to decrypt the signature of the firmware. For example, if a public encryption key associated with a storage system IHS was utilized to decrypt a signature of a server firmware, the hash value of the server firmware may not match a decrypted signature data obtained with the public encryption key associated with the storage system IHS. In one instance, a public encryption key associated with a storage system IHS may be an incorrect public encryption key to properly decrypt a server firmware signature. In another instance, a public encryption key associated with a server IHS may be an incorrect public encryption key to properly decrypt a storage system firmware signature. If the hash value matches the decrypted signature data, the new firmware may be installed, at 550. For example, if the hash value matches the decrypted signature data, IHS 110 may install the new firmware.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A manufacturing system, comprising:
an information handling system manufacturer;
a first division of the information handling system manufacturer;
a second division of the information handling system manufacturer; and
a storage facility of the information handling system manufacturer;
wherein the information handling system manufacturer is configured to:
manufacture a plurality of motherboards configured to be installed in a plurality of information handling system product lines;
respectively install a plurality of non-volatile memory media on the plurality of motherboards;
initially store, at a first time and for each of the plurality of motherboards, first product line firmware, associated with a first product line of the information handling system manufacturer, via the plurality of non-volatile memory media for each of the plurality of motherboards, wherein the first product line firmware is stored at the first time when an identity type of the plurality of motherboards is uncommitted;
provide a first portion of the plurality of motherboards to the first division;
provide a second portion of the plurality of motherboards to the second division; and
provide a third portion of the plurality of motherboards to the storage facility;
wherein the first division is configured to:
permanently store a first information handling system identity type on the first portion of the plurality of motherboards; and
install the first portion of the plurality of motherboards in a first plurality of information handling systems; and
wherein the second division is configured to:
permanently store a second information handling system identity type on the second portion of the plurality of motherboards;
store, at a second time after the first time and for each of the second portion of the plurality of motherboards, second product line firmware to replace the first product line firmware of each of the second portion of the plurality of motherboards, associated with a second product line of the information handling system manufacturer, via non-volatile memory media for each of the second portion of the plurality of motherboards, the second product line firmware differing from the first product line firmware; and
install the second portion of the plurality of motherboards in a second plurality of information handling systems.

2. The manufacturing system of claim 1, wherein the storage facility is further configured to:
receive a request for a motherboard associated with the first product line; and
permanently store the first information handling system identity type on a motherboard of the third portion of the plurality of motherboards.

3. The manufacturing system of claim 2, wherein the storage facility is further configured to ship the motherboard of the third portion of the plurality of motherboards to a customer associated with the request for the motherboard associated with the first product line.

4. The manufacturing system of claim 1, wherein the storage facility is further configured to:
receive a request for a motherboard associated with the second product line;
permanently store the second information handling system identity type on a motherboard of the third portion of the plurality of motherboards; and
store the second product line firmware via a non-volatile memory medium of the motherboard of the third portion of the plurality of motherboards.

5. The method of claim 4, wherein the storage facility is further configured to ship the motherboard of the third portion of the plurality of motherboards to a customer associated with the request for the motherboard associated with the second product line.

6. The manufacturing system of claim 1,
wherein the first division is further configured to ship the first plurality of information handling systems to a first plurality of customers; and
wherein the second division is further configured to ship the second plurality of information handling systems to a second plurality of customers.

7. The manufacturing system of claim 6, wherein a customer of the first plurality of customers is a customer of the second plurality of customers.

8. The manufacturing system of claim 1, wherein the storage facility is further configured to:
ship a motherboard of the third portion of the plurality of motherboards to a customer; and
provide an application configured to permanently store the first information handling system identity type or the second information handling system identity type on the motherboard of the third portion of the plurality of motherboards.

9. The manufacturing system of claim 1, wherein the information handling system manufacturer is further configured to:
store a first certificate associated with the first product line, wherein the first certificate includes a first public key utilizable to authenticate the first product line firmware; and
store a second certificate associated with the second product line, wherein the second certificate includes a second public key utilizable to authenticate the second product line firmware.

10. A method, comprising:
manufacturing, by an information handling system manufacturer, a plurality of motherboards configured to be installed in a plurality of information handling system product lines;
respectively installing, by the information handling system manufacturer, a plurality of non-volatile memory media on the plurality of motherboards;
initially storing, at a first time for each of the plurality of motherboards and by the information handling system manufacturer, first product line firmware, associated with a first product line of the information handling system manufacturer, via the plurality of non-volatile memory media for each of the plurality of motherboards, wherein the first product line firmware is stored at the first time when an identity type of the plurality of motherboards is uncommitted;

providing, by the information handling system manufacturer, a first portion of the plurality of motherboards to a first division of the information handling system manufacturer;

providing, by the information handling system manufacturer, a second portion of the plurality of motherboards to a second division of the information handling system manufacturer;

providing, by the information handling system manufacturer, a third portion of the plurality of motherboards to a storage facility;

permanently storing, by the first division, a first information handling system identity type on the first portion of the plurality of motherboards;

installing, by the first division, the first portion of the plurality of motherboards in a first plurality of information handling systems;

permanently storing, by the second division, a second information handling system identity type on the second portion of the plurality of motherboards;

storing, at a second time after the first time for each of the second portion of the plurality of motherboards and by the second division, second product line firmware to replace the first product line firmware of each of the second portion of the plurality of motherboards, associated with a second product line of the information handling system manufacturer, via non-volatile memory media for each of the second portion of the plurality of motherboards, the second product line firmware differing from the first product line firmware; and installing, by the second division, the second portion of the plurality of motherboards in a second plurality of information handling systems.

11. The method of claim 10, further comprising:
receiving, by the storage facility, a request for a motherboard associated with the first product line; and
permanently storing, by the storage facility, the first information handling system identity type on a motherboard of the third portion of the plurality of motherboards.

12. The method of claim 11, further comprising:
shipping, by the storage facility, the motherboard of the third portion of the plurality of motherboards to a customer associated with the request for the motherboard associated with the first product line.

13. The method of claim 10, further comprising:
receiving, by the storage facility, a request for a motherboard associated with the second product line;
permanently storing, by the storage facility, the second information handling system identity type on a motherboard of the third portion of the plurality of motherboards; and
storing, by the storage facility, the second product line firmware via a non-volatile memory medium of the motherboard of the third portion of the plurality of motherboards.

14. The method of claim 13, further comprising:
shipping, by the storage facility, the motherboard of the third portion of the plurality of motherboards to a customer associated with the request for the motherboard associated with the second product line.

15. The method of claim 10, further comprising:
shipping, by the first division, the first plurality of information handling systems to a first plurality of customers; and
shipping, by the second division, the second plurality of information handling systems to a second plurality of customers.

16. The method of claim 15, wherein a customer of the first plurality of customers is a customer of the second plurality of customers.

17. The method of claim 10, further comprising:
shipping, by the storage facility, a motherboard of the third portion of the plurality of motherboards to a customer; and
providing, by the storage facility, an application configured to permanently store the first information handling system identity type or the second information handling system identity type on the motherboard of the third portion of the plurality of motherboards.

18. The method of claim 10, further comprising:
storing, by the information handling system manufacturer, a first certificate associated with the first product line, wherein the first certificate includes a first public key utilizable to authenticate the first product line firmware; and
storing, by the information handling system manufacturer, a second certificate associated with the second product line, wherein the second certificate includes a second public key utilizable to authenticate the second product line firmware.

19. The manufacturing system of claim 1, wherein a particular information handling system of first plurality of information handling systems is configured to:
enter a system management mode;
identify the first information handling system (IHS) identity type from the non-volatile memory medium;
determine, based at least on the first IHS identity type, a public encryption key from a plurality of public encryption keys;
receive a firmware image that includes new firmware and a signature of the new firmware, the new firmware differing from the initial server IHS firmware;
decrypt, utilizing the public encryption key, the signature of the new firmware to obtain decrypted signature data;
determine a hash value of the new firmware;
determine if the hash value matches the decrypted signature data;
if the hash value does not match the decrypted signature data, provide information indicating that the firmware image will not be installed; and
if the hash value matches the decrypted signature data, install the new firmware.

20. The manufacturing system of claim 19, wherein the particular information handling system is further configured to:
retrieve the plurality of public encryption keys from a respective plurality of certificates stored by the particular information handling system.

* * * * *